United States Patent
Ohtani et al.

(10) Patent No.: US 7,911,685 B2
(45) Date of Patent: Mar. 22, 2011

(54) CONTROL OF A LIGHT SOURCE PROVIDING EXCITATION LIGHT

(75) Inventors: Toshihiro Ohtani, Kawasaki (JP); Kenichi Sasaki, Kawasaki (JP); Yuji Tamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 162 days.

(21) Appl. No.: 11/945,566

(22) Filed: Nov. 27, 2007

(65) Prior Publication Data

US 2008/0130098 A1 Jun. 5, 2008

(30) Foreign Application Priority Data

Nov. 30, 2006 (JP) .................... 2006-324354

(51) Int. Cl.
*H01S 4/00* (2006.01)
*H04B 10/17* (2006.01)
(52) U.S. Cl. .................... 359/341.3; 359/333
(58) Field of Classification Search ............ 359/341.3, 359/341.44
See application file for complete search history.

(56) References Cited

U.S. PATENT DOCUMENTS

| 5,374,973 | A | * | 12/1994 | Maxham et al. | ........... 359/341.4 |
| 5,539,570 | A | * | 7/1996 | Ushirozawa | ............ 359/341.44 |
| 5,594,748 | A | * | 1/1997 | Jabr | .......................... 372/38.09 |
| 6,407,854 | B1 | * | 6/2002 | Shum | ....................... 359/341.41 |
| 6,690,503 | B2 | | 2/2004 | Yamanaka | |
| 7,039,080 | B1 | * | 5/2006 | Talmadge et al. | ........ 372/29.021 |
| 7,145,717 | B2 | * | 12/2006 | Nakata et al. | ............ 359/341.41 |
| 2004/0174586 | A1 | * | 9/2004 | Nakata et al. | ................. 359/337 |

FOREIGN PATENT DOCUMENTS

| JP | 11-274628 | 10/1999 |
| JP | 2002-344053 | 11/2002 |

* cited by examiner

*Primary Examiner* — Eric Bolda
(74) *Attorney, Agent, or Firm* — Staas & Halsey LLP

(57) ABSTRACT

A controller monitors output level variation rate of excitation light outputted by a light source in accordance with a drive current of the light source and provided to a rare-earth doped amplifying medium so that a signal light is amplified as the signal light travels through the amplifying medium. In an embodiment, the controller decreases the drive current when the monitored output level variation rate is larger than a threshold value, to thereby reduce power level of the outputted excitation light and thereby delay progress of degradation of the light source indicated by the monitored output level variation rate being larger than the threshold value.

19 Claims, 16 Drawing Sheets

CONTROL OF A LIGHT SOURCE PROVIDING EXCITATION LIGHT

The present invention claims foreign priority to Japanese application 2006-324354, filed Nov. 30, 2006, which is incorporated herein by reference in its entirety.

FIELD OF THE INVENTION

The present invention relates to an optical amplifying apparatus, and particularly to an optical amplifying apparatus for amplifying an optical signal.

DESCRIPTION OF THE RELATED ART

An EDFA (Erbium-Doped Fiber Amplifier) is widely used as an amplifier for an optical signal. The EDFA is an optical fiber amplifier using EDF (Erbium Doped Fiber). In EDF Er (Erbium) as a rare earth is added to the core of an optical fiber. In the EDFA, excitation light is irradiated to the EDF and an optical signal light is advanced, and the level of the optical signal light is amplified by stimulated emission generated in the EDF.

In an optical amplifier for WDM (Wavelength Division Multiplexing) transmission, in order to realize long-distance transmission and multi-wavelength multiplexing transmission, it is desired to achieve both a large power output characteristic (as the wavelength multiplexing number becomes large, the amplified output is increased) and a low noise characteristic (to suppress OSNR (Optical Signal Noise Ratio) degradation after amplification).

Thus, in the case where the WDM signal light is optically amplified by the EDFA, optical amplification control is generally performed which uses both the excitation of 0.98 μm light and 1.48 μm light. By using 0.98 μm excitation light, lower noise amplification characteristic can be obtained. By using 1.48 μm excitation light, large power amplification output can be obtained.

FIG. 15 is a schematic view of an optical amplifying apparatus. An optical amplifying apparatus 50 includes a front stage EDFA 51, a back stage EDFA 52 and a drive control unit 53. The front stage EDFA 51 includes a front stage EDF 51a and an LD (laser Diode) 51b, and the back stage EDFA 52 includes a back stage EDF 52a and an LD 52b.

The LD 51b receives a drive current c1 transmitted from the drive control unit 53 and outputs excitation light of 0.98 μm to be incident on the front stage EDF 51a, and the front stage EDF 51a amplifies a WDM signal flowing from an optical fiber and outputs it. The LD 52b receives a drive current c2 transmitted from the drive control unit 53 and outputs excitation light of 1.48 μm to be incident on the back stage EDF 52a, and the back stage EDF 52a again amplifies the WDM signal outputted from the front stage EDF 51a and transmits it onto an optical fiber.

As stated above, the OSNR after optical amplification depends on the NF (Noise Factor) of the optical amplifier and the input level. That is, as the NF becomes small the OSNR becomes good, and as the input level becomes high the OSNR becomes good). In a WDM transmission, in order to suppress the OSNR degradation to the minimum, the control is performed such that a weak optical signal is once amplified by the excitation of the 0.98 μm light with the excellent NF characteristic, and then is amplified to high power by the excitation of the 1.48 μm light.

As optical amplification control of the related art, a technique in which the target value of output power of an LD is decreased by a specified ratio to prolong the life of the LD is disclosed (for example, the following patent document 1).

[Patent document 1] JP-A-11-274628.

DESCRIPTION OF THE DRAWINGS

FIG. 9 is a view showing a state at the time of normal operation.

FIG. 10 is a view showing a state where the failure occurs.

FIG. 11 is a view showing a state in which error notification is made by the OSC signal.

DESCRIPTION OF THE PREFERRED EMBODIMENTS

Figure 1:
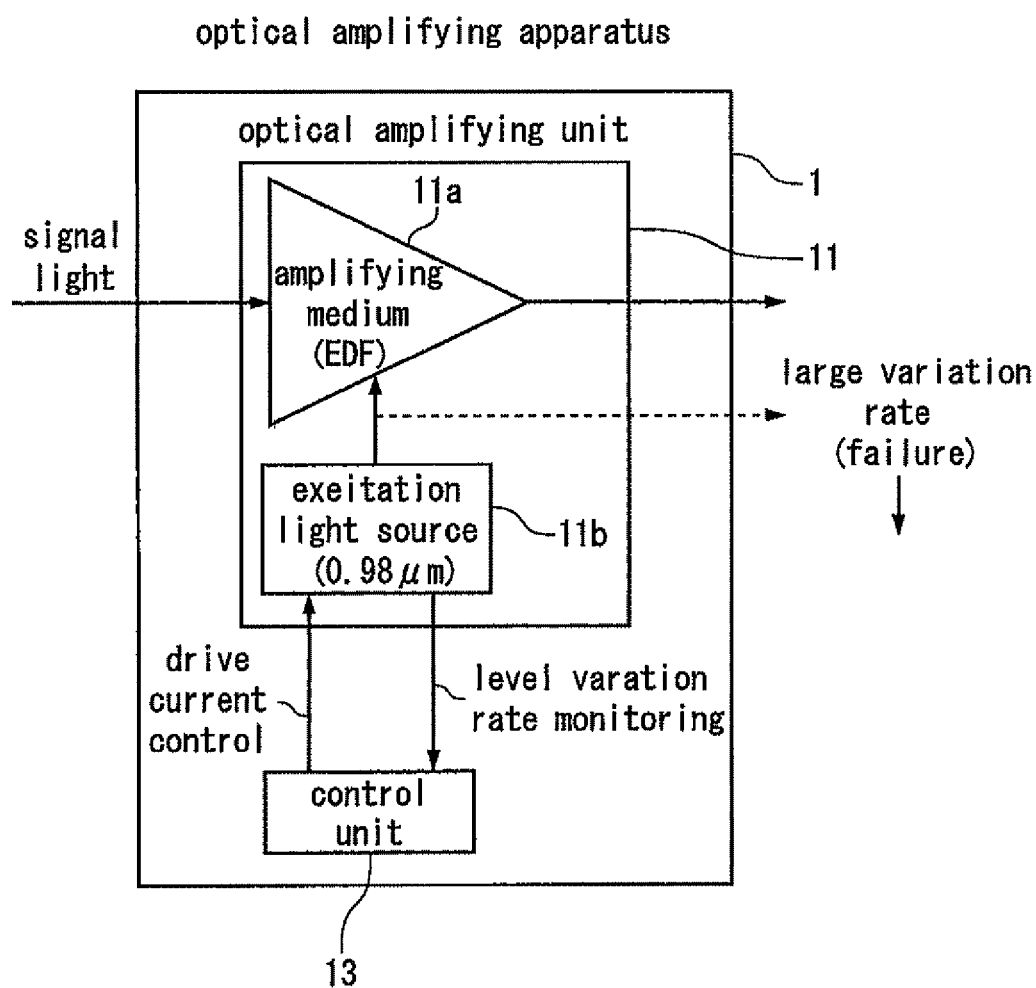
FIG. 1 is a one schematic view of an optical amplifying apparatus of the embodiment.

Reference will now be made in detail to embodiments of the present invention, examples of which are illustrated in the accompanying drawings, wherein like reference numerals refer to like elements throughout.

In general, a short wavelength LD such as an LD of 0.98 μm has had a problem of a "sudden death" phenomenon in which the optical output is suddenly degraded and a failure occurs in about several hours. This is a kind of failure and suddenly occurs without prior sign.

The sudden death occurs because of crystal fusion in the LD active layer called COD (Catastrophic Optical Damage), and is triggered in such a way that a component (for example, A1) in the LD material (AlGaAs (aluminum gallium arsenide)) is oxidized, the band gap width becomes narrow, and excitation light of 0.98 μm band emitted by itself is absorbed.

When the self-excitation light is absorbed, the temperature rises locally in the crystal, the band gap width is further narrowed by this to raise the degree of absorption, and the crystal fusion finally occurs, so that the LD light emission area is damaged. As the power becomes high, this damage is liable to occur, and the time up to the crystal fusion becomes short in proportion to about the square of the power. Incidentally, since the LD of 1.48 μm does not contain a material which is apt to be oxidized, in general, a probability that the sudden death occurs is close to zero.

Figure 16:
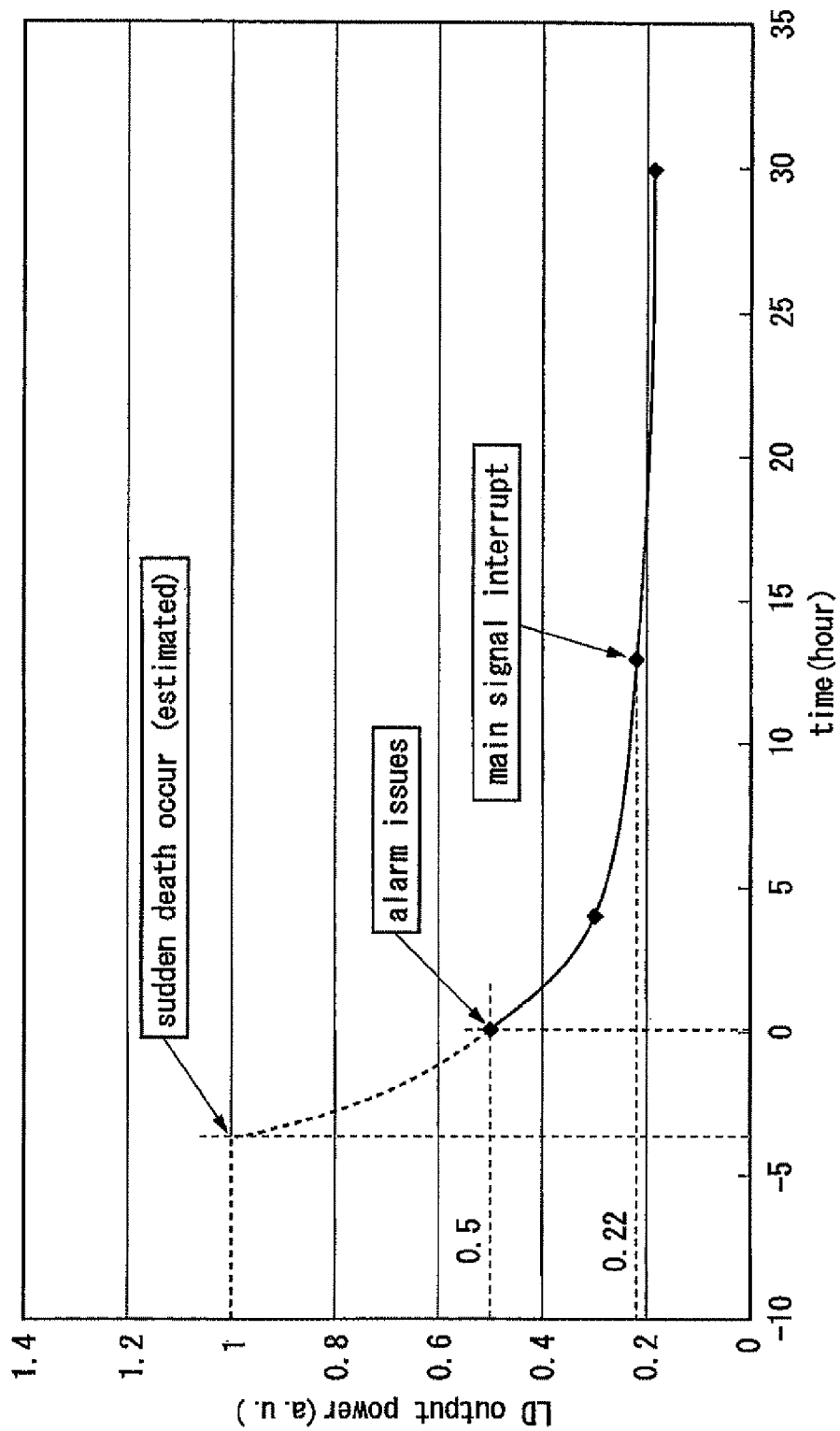
FIG. 16 is a view showing an output change of an LD in which the sudden death occurs.

FIG. 16 is a view showing an output change of an LD in which the sudden death occurs. The horizontal axis indicates time, and the vertical axis indicates LD output power of 0.98 μm. The optical amplifying apparatus 50 in which the sudden death appears to occur is collected from a station, and the state is shown in which the output change of the LD 51*b* (hereinafter referred to as the 0.98 μm LD 51*b*) is measured. Incidentally, the output of the 0.98 μm LD 51*b* is reduced and when the output level becomes 0.5, an alarm is issued from the apparatus. The alarm issue time is recorded in the log of the optical amplifying apparatus 50, and in the drawing, the time point when the alarm is issued is made time 0.

A solid line in the plus direction from the time 0 indicates actual measurement values of the output power of the 0.98 μm LD 51*b* which was collected from the station. The output of the 0.98 μm LD 51*b* is reduced, and when about 13 hours has passed since the occurrence of the alarm and the output level of the 0.98 μm LD 51*b* becomes 0.22, the main signal of the optical amplifying apparatus 50 is interrupted.

That is, when the sudden death occurs in the 0.98 μm LD 51*b* and the output of the front stage EDF 51*a* is reduced, by the ALC (Auto Level Control) function for maintaining the EDF output level constant, the back stage EDFA 52 raises the gain in order to compensate for the level reduced in the front stage EDFA 51. However, when the output reduction of the 0.98 μm LD progresses further, since the control of the 1.48 μm LD has the upper limit, it becomes impossible to perform sufficient amplification, and eventually, the output of the main signal is interrupted when about 13 hours has passed since the occurrence of the alarm.

A dotted line in the minus direction from time 0 indicates estimated values of the output reduction of the 0.98 μm LD 51 between the time points of the occurrence of the alarm and the occurrence of the sudden death, and it is estimated that the sudden death occurred about 4 hours before the occurrence of the alarm.

Accordingly, in the case of this example, it is estimated that the main signal is interrupted about 17 hours after the occurrence of the sudden death. Besides, it is necessary for a maintenance person to perform repair work, such as part replacement of the 0.98 μm LD 51*b*, within 13 hours after the time of the occurrence of the alarm. Incidentally, as the wavelength multiplexing number of the WDM becomes large, the gain rise of the back stage EDFA 52 reaches the limit value early, and accordingly, the time till the main signal interruption becomes shorter.

On the other hand, in the optical amplifying apparatus 50, the APC (Auto Power Control) for maintaining the output level of the 0.98 μm LD 51*b* constant is performed, and in the case where the output power is reduced due to the aging or life of the 0.98 μm LD element, the drive current c1 flowing to the 0.98 μm LD 51*b* is increased to maintain the output.

However, when the drive current c1 is increased and is supplied to the 0.98 μm LD 51*b* in which the sudden death occurred, the degradation due to the sudden death is more accelerated, and there is a possibility that signals of all WDM channels are interrupted before the maintenance person performs the part replacement or the like.

As stated above, in the countermeasure against the occurrence of the sudden death of the 0.98 μm LD 51*b* according to the related art, the part replacement must be performed within a very short time, such as several hours to ten and several hours, from the occurrence of the alarm. And further, with respect to the output reduction of the 0.98 μm LD 51*b*, the same output constant control is performed without determining whether the output reduction is due to the aging or life, or the output reduction is due to the failure, and accordingly, there has been a problem that the sudden death degradation is accelerated and the time up to the signal interruption is shortened.

Hereinafter, an embodiment of the invention will be described with reference to the drawings. FIG. 1 is a one view of an optical amplifying apparatus. An optical amplifying apparatus 1 includes an optical amplifying unit 11 and a control unit 13, and is an apparatus for amplifying an optical signal.

The optical amplifying unit 11 includes an amplifying medium 11*a* doped with an active material for optical amplification, and an excitation light source 11*b* to emit excitation light, and causes the excitation light to be incident on the amplifying medium 11*a* and performs the optical amplification. Specifically, the amplifying medium 11*a* is an EDF, and the excitation light source 11*b* is an LD to emit 0.98 μm excitation light of a short wavelength.

The control unit 13 monitors the excitation light, and supplies a drive current for driving the excitation light source 11*b*. At this time, the level variation rate as the rate of reduction in the output level of the excitation light is monitored, and in the case where the level variation rate is larger than a threshold value, it is judged that a failure occurs in the excitation light source 11*b*, and the drive current is decreased to reduce the output level of the excitation light, so that the progress of degradation of the excitation light source 11*b* due to the failure is delayed.

Figure 2:
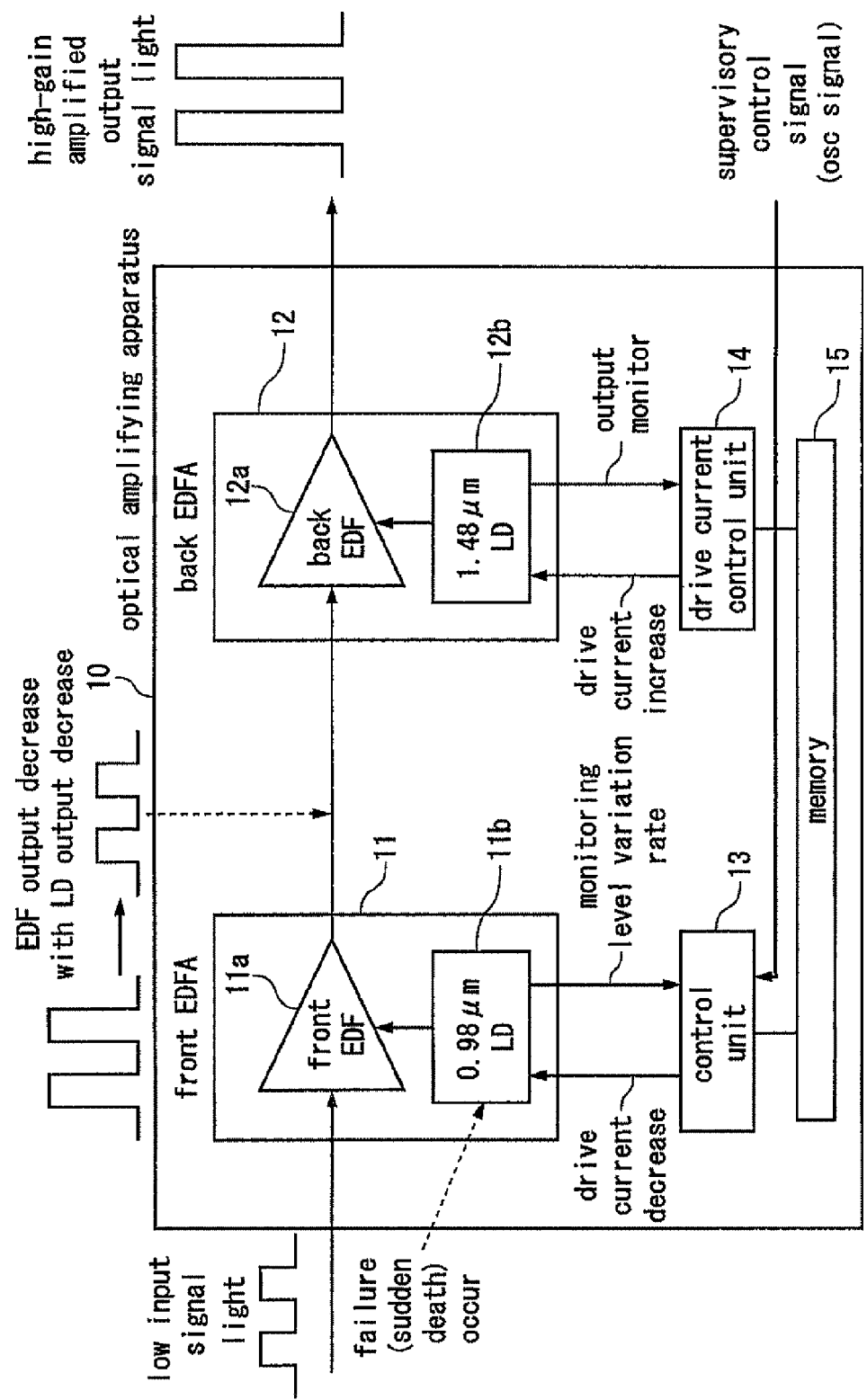
FIG. 2 is a view showing a structure of an optical amplifying apparatus.

Next, a specific apparatus structure to which the optical amplifying apparatus 1 is applied will be described. FIG. 2 is a view showing a structure of an optical amplifying apparatus. An optical amplifying apparatus 10 includes a front stage EDFA 11 (first optical amplifying unit), a back stage EDFA 12 (second optical amplifying unit), a control unit 13 (first control unit), a drive current control unit 14 (second control unit) and a memory 15. The front stage EDFA 11 includes a front stage EDF 11*a* (first amplifying medium) and a 0.98 μm LD 11*b* (first excitation light source), and the back stage EDFA 12 includes a back stage EDF 12*a* (second amplifying medium) and a 1.48 μm LD 12*b* (second excitation light source).

The 0.98 μm LD 11*b* receives an LD drive current transmitted from the control unit 13 and outputs excitation light of 0.98 μm to be incident on the front stage EDF 11*a*, and the front stage EDF 11*a* amplifies and outputs a WDM signal flowing from an optical fiber. The 1.48 μm LD 12*b* receives an LD drive current transmitted from the drive current control unit 14 and outputs excitation light of 1.48 μm to be incident on the back stage EDF 12*a*, and the back stage EDF 12*a* again amplifies the WDM signal outputted from the front stage EDF 11*a* and transmits it to an optical fiber.

The memory 15 stores, for example, initial drive current values of the 0.98 μm LD 11*b* and the 1.48 μm LD 12*b* corresponding to the wavelength multiplexing number of the WDM, a threshold value for determination of failure occurrence, and the like, and these values can be set from the outside.

Incidentally, as shown in the drawing, the control unit 13 receives an OSC (Optical Supervisory Channel) signal as a monitor control signal transmitted from a downstream station (not shown). This is such that at the time of reduction control of the 0.98 μm LD drive current due to the occurrence of the failure, the reception quality state in the downstream station to receive the optical signal outputted from the back stage EDFA 12 is recognized through the OSC signal, and the reduction control of the 0.98 μm LD 11*b* is performed so that the reception quality state does not exceed an error allowable value (described later in FIG. 9 to FIG. 11).

Next, the operation of the control unit 13 and the drive current control unit 14 will be described. Incidentally, as output constant control, control to make an LD output level constant is called APC control, and control to make an EDF output level constant is called ALC control.

The control unit 13 receives back light of the 0.98 μm LD 11b and monitors the level variation rate (degree of inclination of output reduction in a time width) of the 0.98 μm LD 11b based on the received light level.

When the output reduction remarkably appears in a short time such as minute units or hour units, the level variation rate becomes large, and there arises a possibility that the failure occurs in the 0.98 μm LD 11b. Accordingly, in the case where the level variation rate is larger than a previously set threshold value, it is judged that the failure occurs in the 0.98 μm LD 11b, and the drive current is decreased to reduce the output level of the 0.98 μm excitation light, so that the progress of degradation of the 0.98 μm LD 11b due to the failure is delayed.

Incidentally, in the case where the reduction control of the output level is performed, for example, when the initial power of the 0.98 μm LD 11b is 130 mW, it is appropriate that the output level is decreased to 40 to 50 mW (=about 30 to 40%). When the power is larger than this, the effect to relieve the acceleration of the sudden death degradation is weakened, and when the power is too small (about 30 mw or lower), the transmission quality is extremely degraded. In this way, when the output level is decreased to 30 to 40%, the APC control is performed to keep this output level as long as possible.

In the output reduction of the excitation light due to aging or the like, since the output is gradually reduced over a long span such as month units or year units, the level variation rate is small. Accordingly, in the case where the level variation rate is smaller than the threshold value, and it is recognized that there is no possibility of failure, it is judged that the output reduction occurs due to aging or life, and the APC control is performed in which the drive current is increased to increase the output level of the 0.98 μm excitation light, so that the output level of the front stage EDF 11a becomes constant.

However, even in the case where the level variation rate is smaller than the threshold value, there is also a possibility that the output reduction due to the failure, not the aging, occurs. Accordingly, in the case where the level variation rate continues to be reduced while not exceeding the threshold value, it is necessary to increase/decrease the drive current after checking whether the output reduction is due to the aging or the output reduction is due to the failure. This determination control will be described later with reference to FIG. 14.

On the other hand, the drive current control unit 14 monitors the output of the back stage EDF 12a, and in the case where the output reduction of the back stage EDF 12a is recognized, the drive current is increased to increase the output level of the 1.48 μm excitation light, and the ALC control is performed (actually, the APC control for the 1.48 μm LD 12b is also performed).

The drawing shows the case where the failure occurs in the 0.98 μm LD 11b. When recognizing that the level variation rate is larger than the threshold value, the control unit 13 decreases the drive current to reduce the output level of the 0.98 μm LD 11b.

Then, since the input level to the back stage EDFA 12 becomes small, the output level of the back stage EDF 12a is reduced. When recognizing the output level reduction of the back stage EDF 12a, the drive current control unit 14 increases the drive current to increase the output level of the 1.48 μm excitation light and performs the ALC control.

Figure 3:
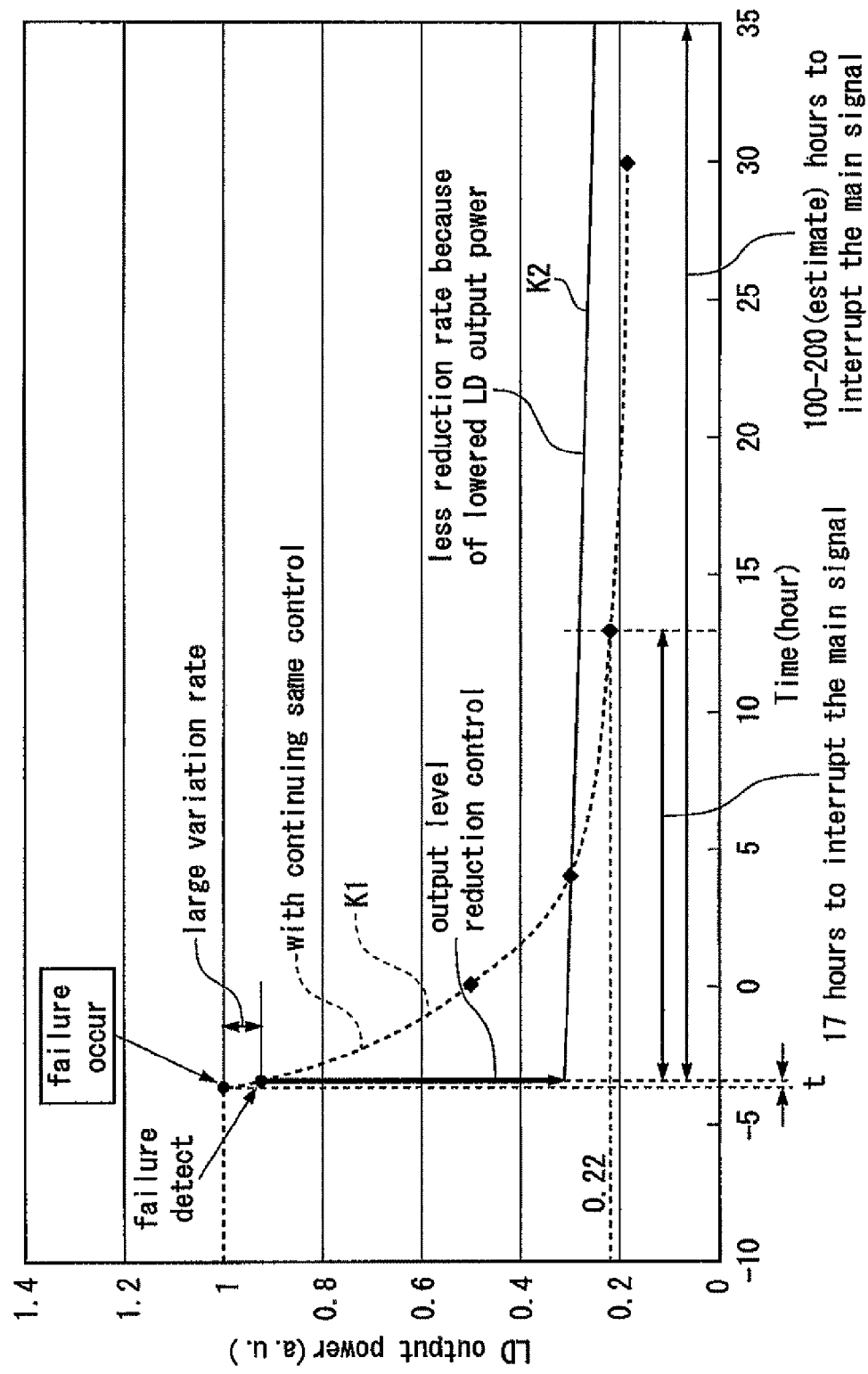
FIG. 3 is a view showing the output change of the 0.98 μm LD by failure.

Next, the output change of the 0.98 μm LD will be described. FIG. 3 is a view showing the output change of the 0.98 μm LD. The horizontal axis indicates time, and the vertical axis indicates LD output power. A dotted line K1 is the same as the curved line shown in FIG. 16, and a solid line K2 indicates the output level value of the 0.98 μm LD when a failure occurs in the 0.98 μm LD and the output reduction control is performed.

In the drawing, the sudden death occurs at time (−4), and then, the output of the 0.98 μm LD is much reduced during a time t (for example, several minutes), and the control unit 13 recognizes that the level variation rate is large in the slight time, and detects the failure state after the time t has passed since the failure actually occurred. Then, the control unit 13 decreases the drive current for the 0.98 μm LD to reduce the output level of the 0.98 μm excitation light.

When the output of the 0.98 μm LD is reduced to 0.22, main signal interruption of the optical amplifying apparatus 10 occurs. In this case, as indicated by the dotted line K1, in the control of the related art in which even if the failure occurs, the same drive current as that before the occurrence is supplied, the main signal interruption occurs in a short time such as about 17 hours from the failure occurrence.

On the other hand, as indicated by the solid line K2, in the case where the drive current is decreased from the detection of the failure, and the output level of the 0.98 μm LD is reduced, the reduction of the output level becomes gentle. In this case, it takes about 100 to 200 hours to reach from the failure detection (alarm occurrence) to the level of 0.22 at which the main signal interruption occurs, and the state where the main signal interruption occurs can be delayed.

Figure 4:
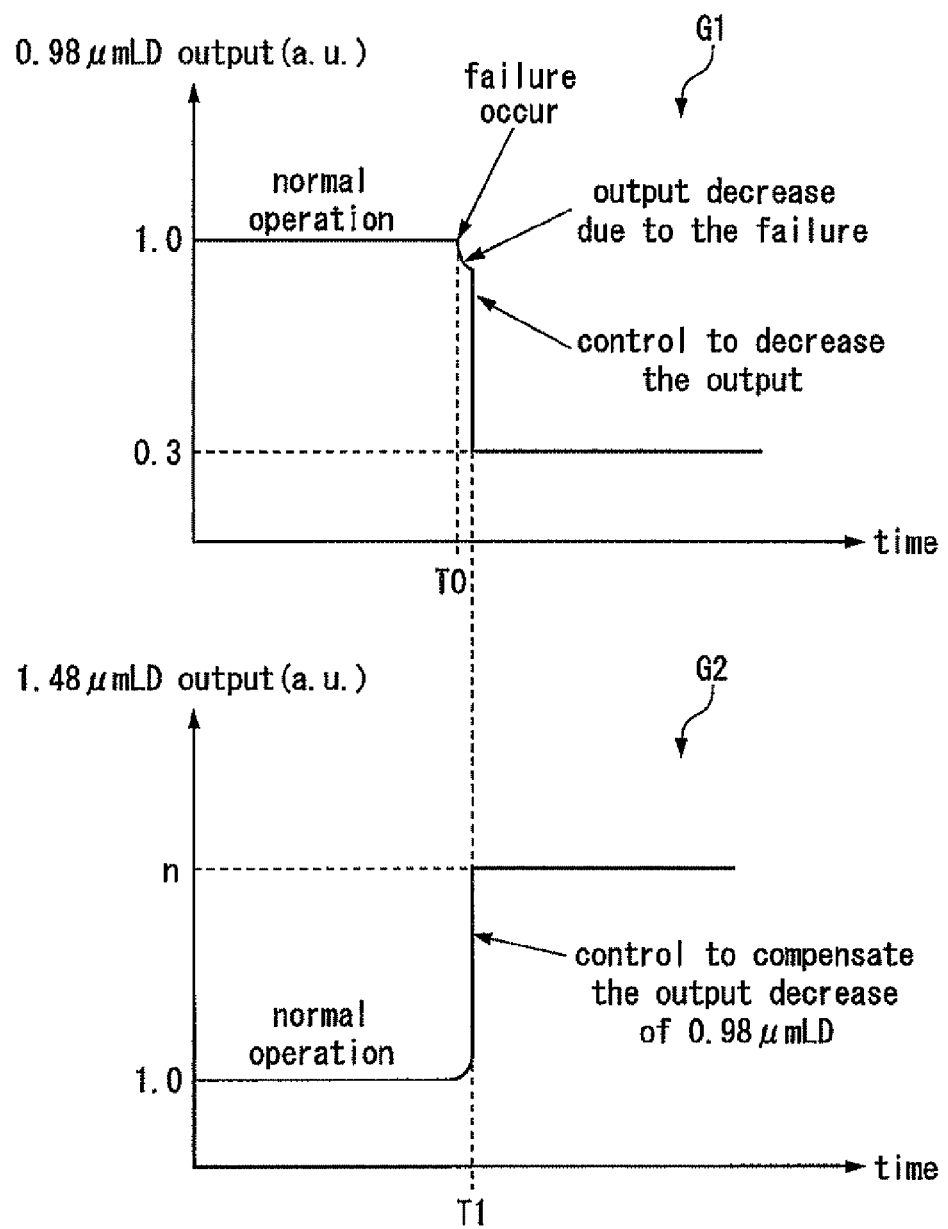
FIG. 4 is a view showing the transition of the power of the 0.98 μm LD and the power of the 1.48 m LD by failure.

FIG. 4 is a view showing the transition of the power of the 0.98 μm LD and the power of the 1.48 μm LD. The horizontal axis indicates time, the vertical axis of graph G1 indicates 0.98 μm LD output power, and the vertical axis of graph G2 indicates 1.48 μm LD output power. The output power of the 0.98 μm LD at the time of normal operation and the output power of the 1.48 μm LD are made 1.0.

In the graph G1, a failure occurs at time T0, the failure is detected at time T1, and the output reduction control to the 0.98 μm LD is performed, so that the output power of the 0.98 μm LD is reduced to 0.3.

In the graph G2, since the output reduction control to the 0.98 μm LD is performed at the time T1, the output power of the 1.48 μm LD is increased up to n in order to compensate this output reduction.

As described above, in the related art, when the sudden death due to the failure occurs, the main signal interruption quickly occurs, and there is a fear that the service is suddenly stopped. On the other hand, in the optical amplifying apparatus 10, in the case where the failure occurs, since the fail soft control to delay the time up to the main signal interruption is performed, even if the quality is degraded to some degree, the service can be continued.

Besides, by this, since the time between the alarm occurrence of the failure and the main signal interruption is prolonged to several days, even if the failure occurs at night or on a holiday, it becomes possible to ensure sufficient maintenance time in which maintenance, such as part replacement, is performed to restore a normal operation state.

Next, a monitor processing of the level variation rate will be described. When the initial power of the 0.98 μm LD is 130 mW, from actual measurement results, it is estimated that it takes about 4 hours until the initial power is reduced to 50% (65 mW) after the occurrence of the failure. When a calculation is made with a straight-line approximation, the output reduction is 16 mW for 1 hour, 0.27 mW for 1 minute, and 0.0044 mW for 1 second.

As stated above, the reduction rate of the level reduction to 50% after the failure occurrence is 0.27 mW/minute. In general, a monitor is performed while an analog value is converted into binary data by an AD converter, and in the case where it is assumed that the full range of the 12-bit AD converter corresponds to 130 mW ($2^{12}-1=4095=130$ mW), 0.27 mW corresponds to about 8 (x≈8 from the proportional expression of 4095:130=x:0.27). That is, in the 12-bit AD converter, 130 mW is divided into 4095 equal parts and expressed, and 0.27 mW corresponds to the 8th part in the 4095 equal parts.

Although 8 is 000000001000 in 12-bit binary, since the low-order 1 to 4 bits are liable to receive the influence of noise and the influence of read error, the bits can not be used for accurate determination (even if values are identical, the representation of 0 and 1 in the low-order 1 to 4 bits is changed each time they are read, the bits can not be used as a determination index).

Then, when detection of a change of 0.54 mW is performed at intervals of 2 minutes, 0.54 mW corresponds to about 17 (y≈17 from the proportional expression of 4095:130=y:0.54), 17 is 000000010001 in 12-bit binary, and the determination can be made with the low-order five bits, and therefore, the influence of noise or the like becomes negligible.

Accordingly, when the initial output power of the 0.98 μm LD is 130 mW, the threshold value as the determination index as to whether the failure occurs or not is set to 0.54 mW, and when the difference (level variation rate) between the present output level monitor value and the output level monitor value before 2 minutes is 0.54 mW or larger, it is judged that the failure occurs in the 0.98 μm LD (that is, it is checked whether or not there is a level reduction of 0.54 mW in 2 minutes).

Incidentally, although the determination as to whether the failure occurs or not is performed in minute units, a monitor value of the output of the 0.98 μm LD may be acquired in a short cycle of, for example, 100 msec.

Figure 5:
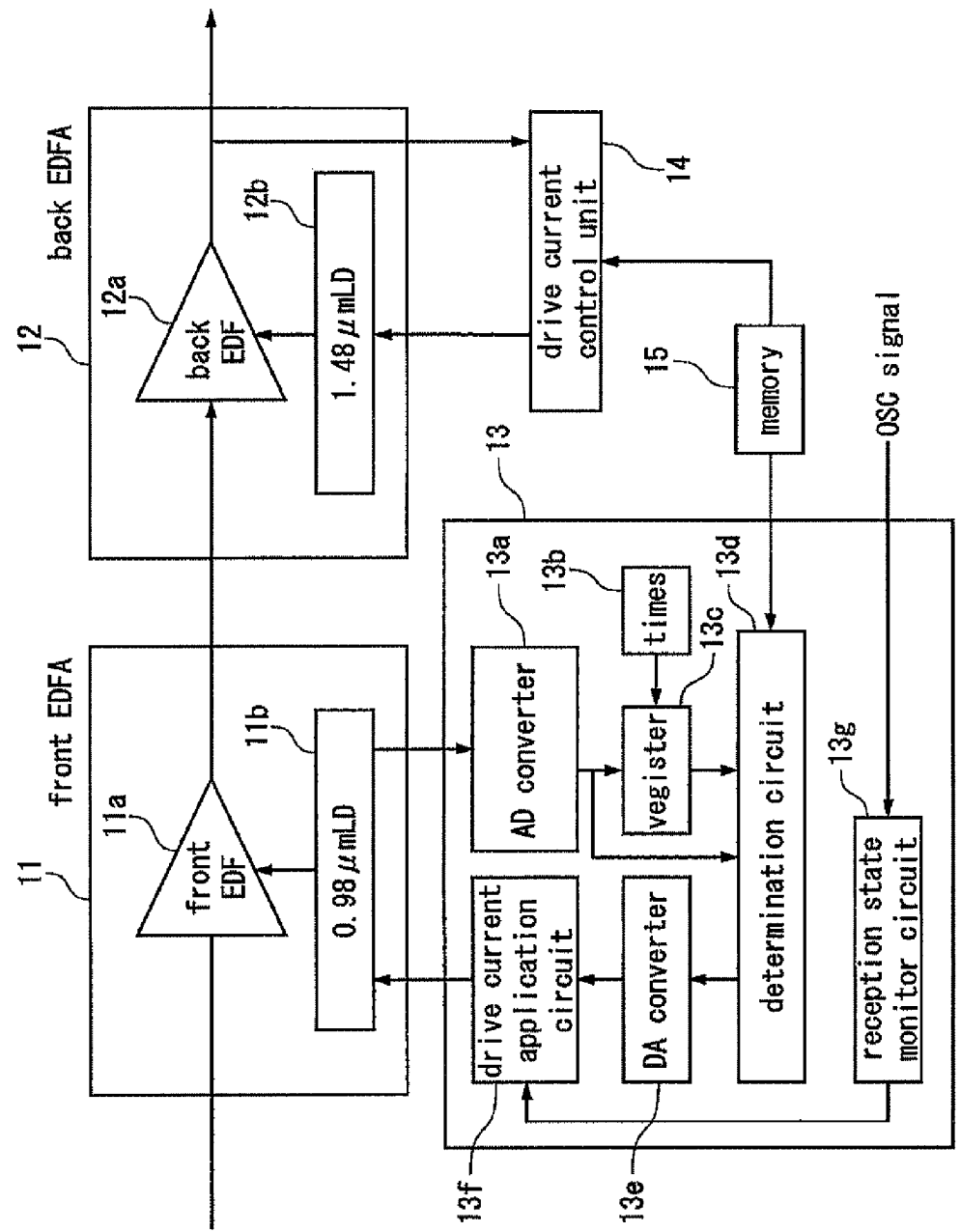
FIG. 5 is a view showing the inner structure of the control unit 13.

Next, an inner structure of the control unit 13 will be described. FIG. 5 is a view showing the inner structure of the control unit 13. The control unit 13 includes an AD converter 13*a*, a timer 13*b*, a register 13*c*, a determination circuit 13*d*, a DA converter 13*e*, a drive current application circuit 13*f*, and a reception state monitor circuit 13*g*.

The AD converter 13*a* receives the back light of the 0.98 μm LD 11*b*, monitors the output of the 0.98 μm LD 11*b*, and converts the monitor value into a digital signal. The timer 13*b* sets a monitor value read time (for example, 100 msec interval). The register 13*c* temporarily stores the digitized monitor value, and outputs the monitor value when the monitor value read time has passed.

The determination circuit 13*d* receives the present monitor value outputted from the AD converter 13*a* and the past monitor value outputted from the register 13*c* to calculate the level variation rate, reads the threshold value stored in the memory 15, compares the level variation rate with the threshold value, and judges whether or not the failure occurs in the 0.98 μm LD 11*b*. When the threshold value is less than the level variation rate, it is judged that the failure occurs, and output reduction data of the 0.98 μm LD 11*b* is outputted to the DA converter 13*e*.

When receiving the output reduction data, the DA converter 13*e* converts it into an analog signal, and the drive current application circuit 13*f* reduces the drive current of the 0.98 μm LD 11*b* based on the analog output reduction data. The reception state monitor circuit 13*g* recognizes the optical signal reception state of a downstream station side based on an OSC signal transmitted from the downstream station, and gives control instructions for drive current increase/decrease to the 0.98 μm LD 11*b* so that the downstream station side does not exceed an error allowable value.

Figure 6:
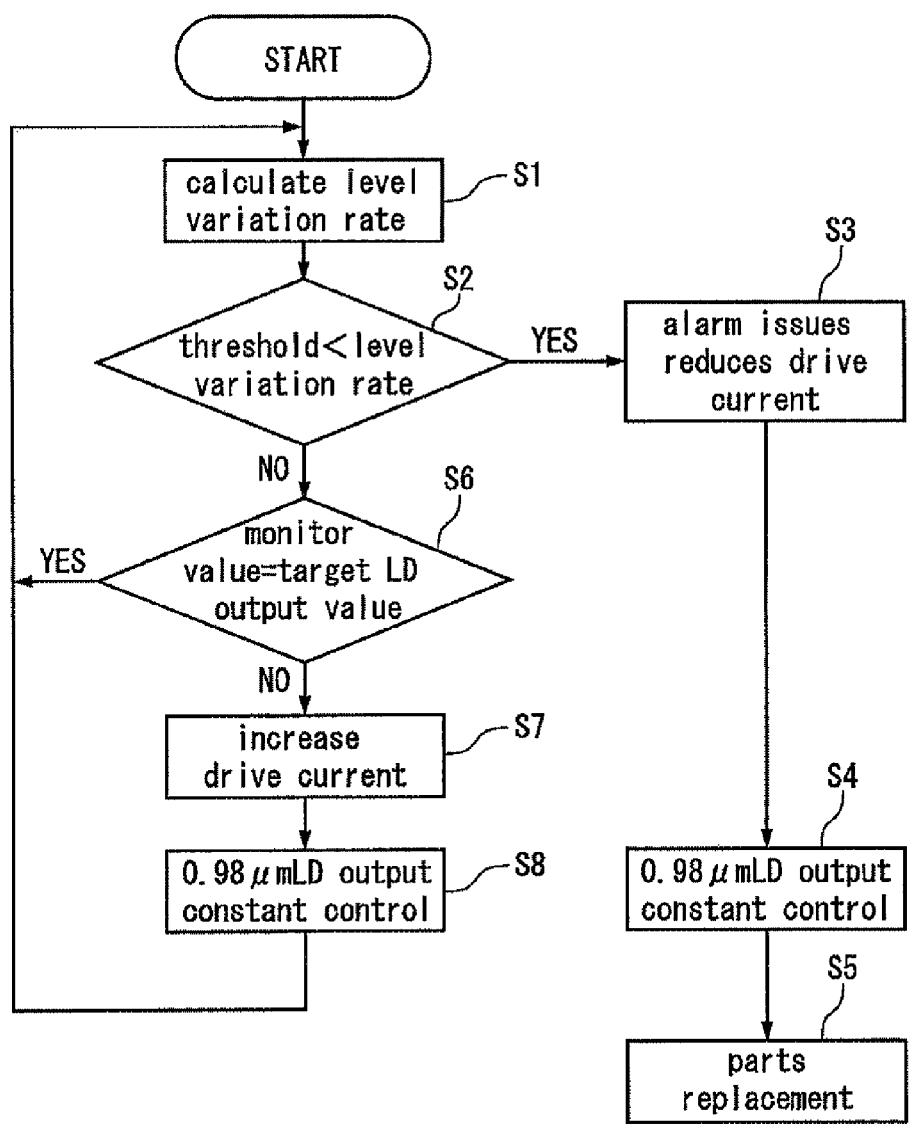
FIG. 6 is a view showing a flowchart including an operation from the failure occurrence of the 0.98 μm LD 11b to the maintenance.

FIG. 6 is a view showing a flowchart including an operation from the failure occurrence of the 0.98 μm LD 11*b* to the maintenance.

(S1) The control unit 13 acquires the output monitor value of the 0.98 μm LD 11*b*, and calculates the level variation rate.

(S2) The control unit 13 compares the threshold value with the level variation rate, and in the case where the level variation rate is larger than the threshold value, it is judged that the failure occurs, and advance is made to step S3, and in the case where the level variation rate is smaller than the threshold value, it is judged that the failure does not occur, and advance is made to step S6.

(S3) The control unit 13 issues an alarm, and reduces the drive current supplied to the 0.98 μm LD 11*b*.

(S4) The control unit 13 performs the output constant control with the reduced value of the drive current of the 0.98 μm LD 11*b* (APC control).

(S5) Part replacement is performed by a maintenance person before the main signal is interrupted.

(S6) The control unit 13 judges whether or not the present monitor value of the 0.98 μm LD 11*b* reaches the target LD output value. When it is reached, return is made to step S1, and when it is not reached, advance is made to step S7.

(S7) The control unit 13 increases the drive current supplied to the 0.98 μm LD 11*b*.

(S8) The control unit 13 performs the output constant control (APC control) so that the output value of the 0.98 μm LD 11*b* becomes the target LD output value, and return is made to step S1.

Incidentally, in the operation of the steps S6 to S8, it is meant that in the case where the output level reduction of the 0.98 μm LD 11*b* irrelevant to the occurrence of the failure is detected, the drive current of the 0.98 μm LD 11*b* is increased, and the output level constant control of the 0.98 μm LD 11*b* is performed.

Figure 7:
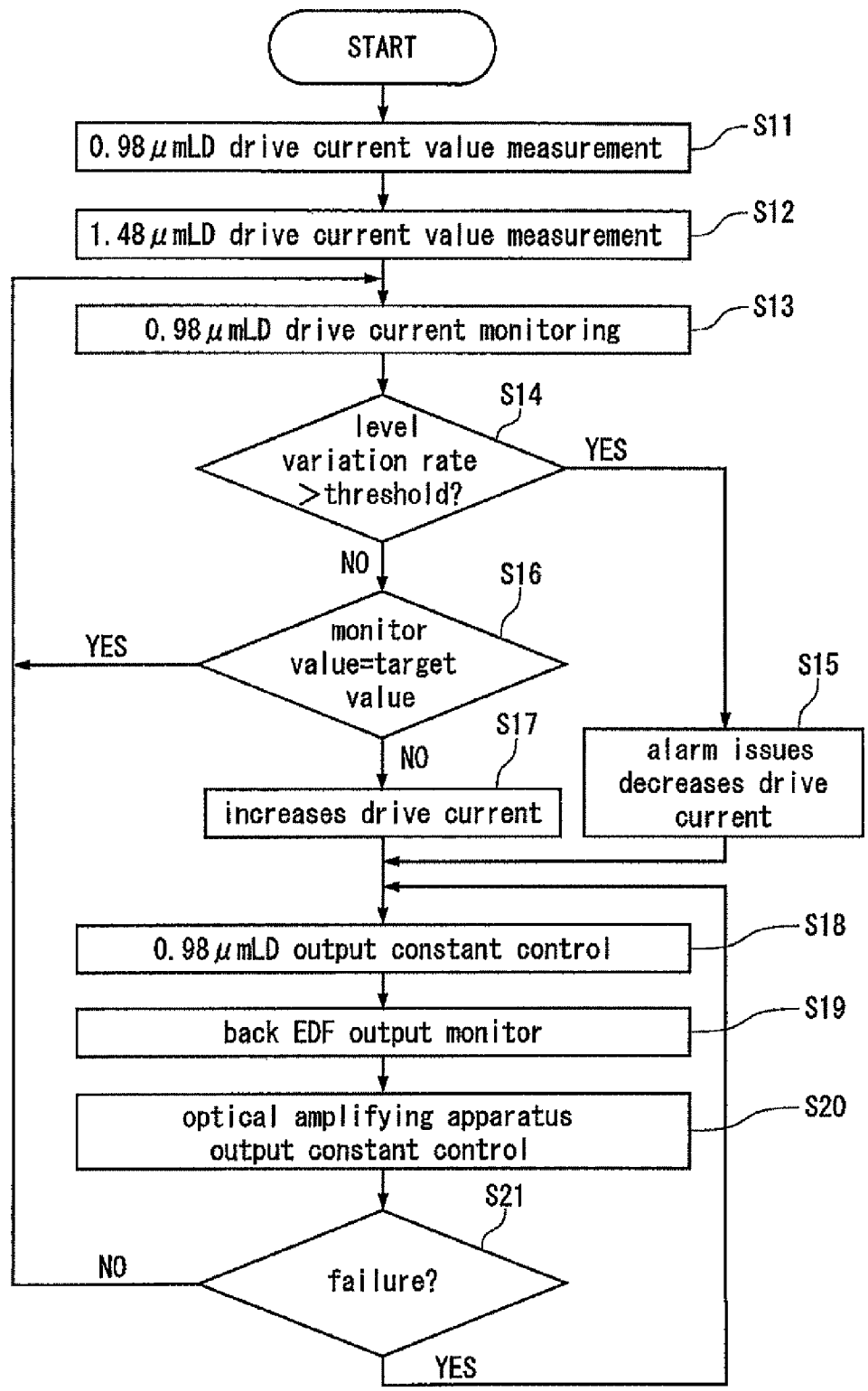
FIG. 7 is a view showing a flowchart of the operation control of the whole optical amplifying apparatus 10.

FIG. 7 is a view showing a flowchart of the operation control of the whole optical amplifying apparatus 10.

(S11) The control unit 13 reads the drive current value of the 0.98 μm LD 11*b* corresponding to the wavelength multiplexing number of WDM from the memory 15, and performs the light emission control of the 0.98 μm LD.

(S12) The drive current control unit 14 reads the drive current value of the 1.48 μm LD 12*b* corresponding to the wavelength multiplexing number of WDM from the memory 15, and performs the light emission control of the 1.48 μm LD 12*b*.

(S13) The control unit 13 monitors the output level of the 0.98 μm LD 11*b*.

(S14) The control unit 13 calculates the level variation rate from the output monitor value of the 0.98 μm LD 11*b*, and judges whether or not the level variation rate is larger than the threshold value, and in the case where it is larger, advance is made to step S15, and in the case where it is smaller, advance is made to step S16.

(S15) The control unit 13 issues an alarm, and decreases the drive current of the 0.98 μm LD 11*b*. For example, when the initial output of the 0.98 μm LD 11*b* is 130 mW, it is decreased to 30% and the output is made 40 mW.

(S16) The control unit 13 judges whether or not the output monitor value of the 0.98 μm LD 11*b* reaches the target LD output value, and when it is reached, return is made to step S13, and when it is not reached, advance is made to step S17.

(S17) The control unit 13 increases the drive current of the 0.98 μm LD 11b.

(S18) The control unit 13 performs the output constant control (APC control) of the 0.98 μm LD 11b.

(S19) The drive current control unit 14 monitors the output level of the back stage EDF 12a.

(S20) The drive current control unit 14 controls the drive current supplied to the 1.48 μm LD 12b so that the output level of the back stage EDF 12a becomes the target apparatus output level (an insufficiency of the output power of the front stage EDFA 11 is compensated in the case where the failure occurs), and performs the output constant control (ALC control) of the optical amplifying apparatus 10.

(S21) In the case of the failure mode in the 0.98 μm LD 11b, return is made to step S18. Besides, in the case of no failure mode, return is made to step S13.

Incidentally, in the description up to here, although the case in which the 0.98 μm LD output is constant irrespectively of the wavelength multiplexing number is used as an example, the wavelength multiplexing number of WDM is also actually considered, and the output power of the 0.98 μm LD 11b is variably controlled.

Figure 8:
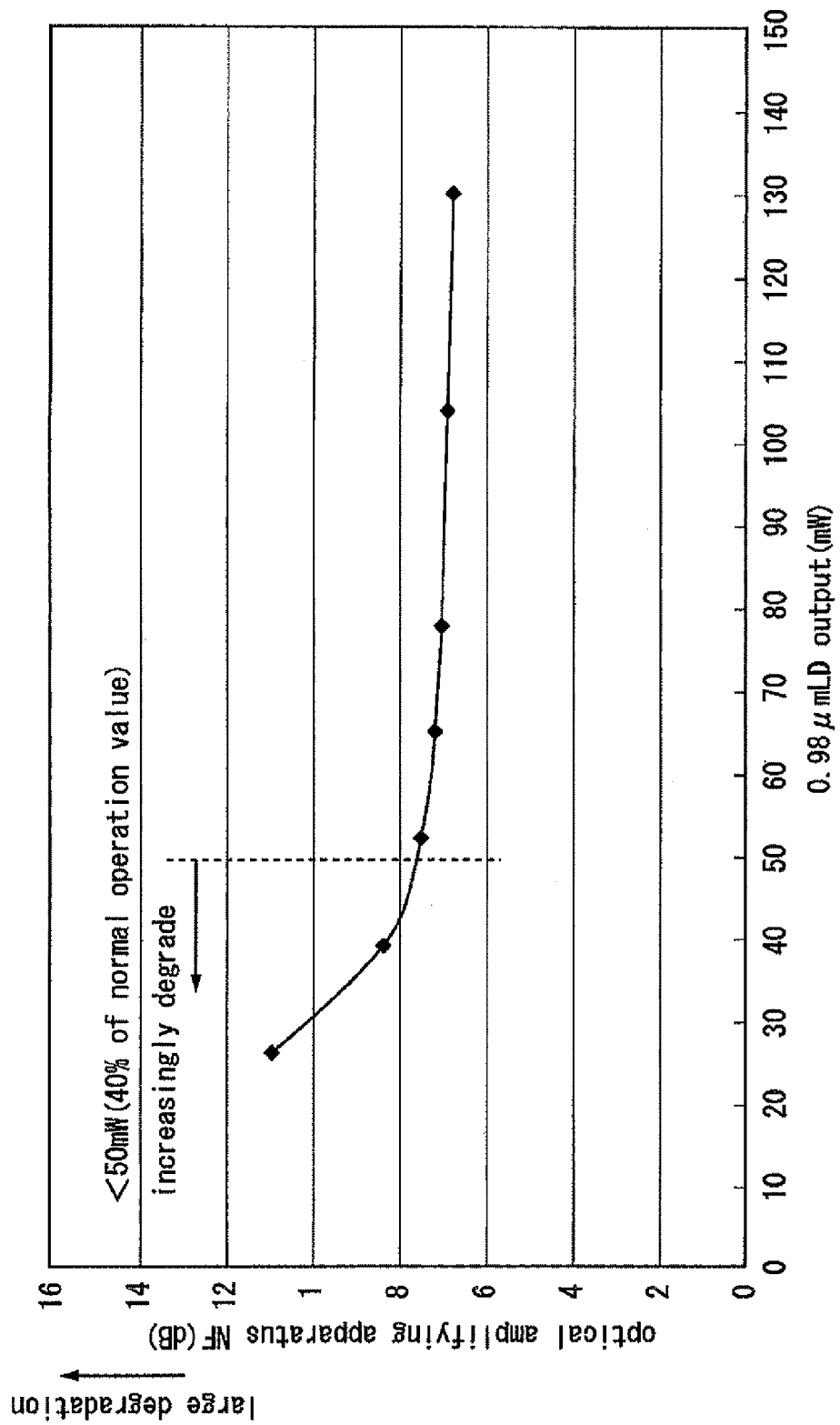
FIG. 8 is a view showing a relation between 0.98 μm LD output and NF of the optical amplifying apparatus 10.

Next, a description will be given to the 0.98 μm LD output control using the OSC signal used for performing operation monitor control of WDM. FIG. 8 is a view showing a relation between 0.98 μm LD output and NF of the optical amplifying apparatus 10. The horizontal axis indicates the 0.98 μm LD output (mW), and the vertical axis indicates the NF (dB) of the optical amplifying apparatus 10. As shown in the drawing, it is understood that the NF of the optical amplifying apparatus 10 is rapidly reduced when the output power of the 0.98 μm LD 11b becomes 50 mW or less (40% or less of the initial power).

Thus, according to conditions of transmission path length, transmission path loss and the like, there is a possibility that an error characteristic is degraded to an unallowable level (for example, an error rate becomes about $10^{-3}$ to $10^{-5}$).

In the case where the output of the 0.98 μm LD is reduced to about 40 mW (30% of the initial power), the control is performed such that the output power of the 1.48 μm LD 12b is increased to increase the gain of the back stage EDF 12a, and the output of the optical amplifying apparatus 10 becomes constant. However, in the receiving station opposite to the optical amplifying apparatus 10, there is a possibility that the error rate is degraded to an unallowable state by the degradation of OSNR although the main signal interruption does not occur.

Accordingly, in order that the error rate does not become lower than the allowable value, control is performed such that the downstream station uses the OSC signal and notifies the station where the 0.98 μm LD 11b is in failure that the error rate is lower than the allowable value, and the output power of the 0.98 μm LD 11b is increased until the error characteristic is brought into the allowable range.

Figure 9:
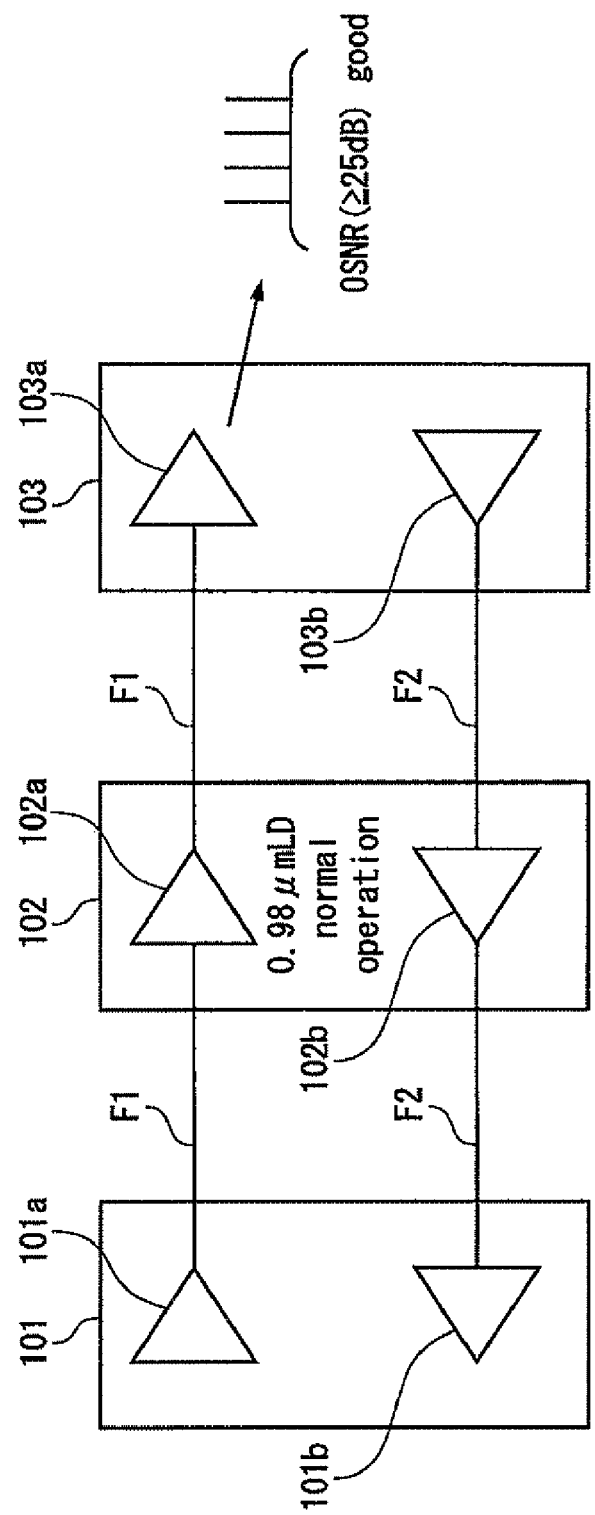
FIG. 9 to FIG. 11 are views showing a state in which the output control of the 0.98 μm LD 11b is performed using the OSC signal.
Figure 10:
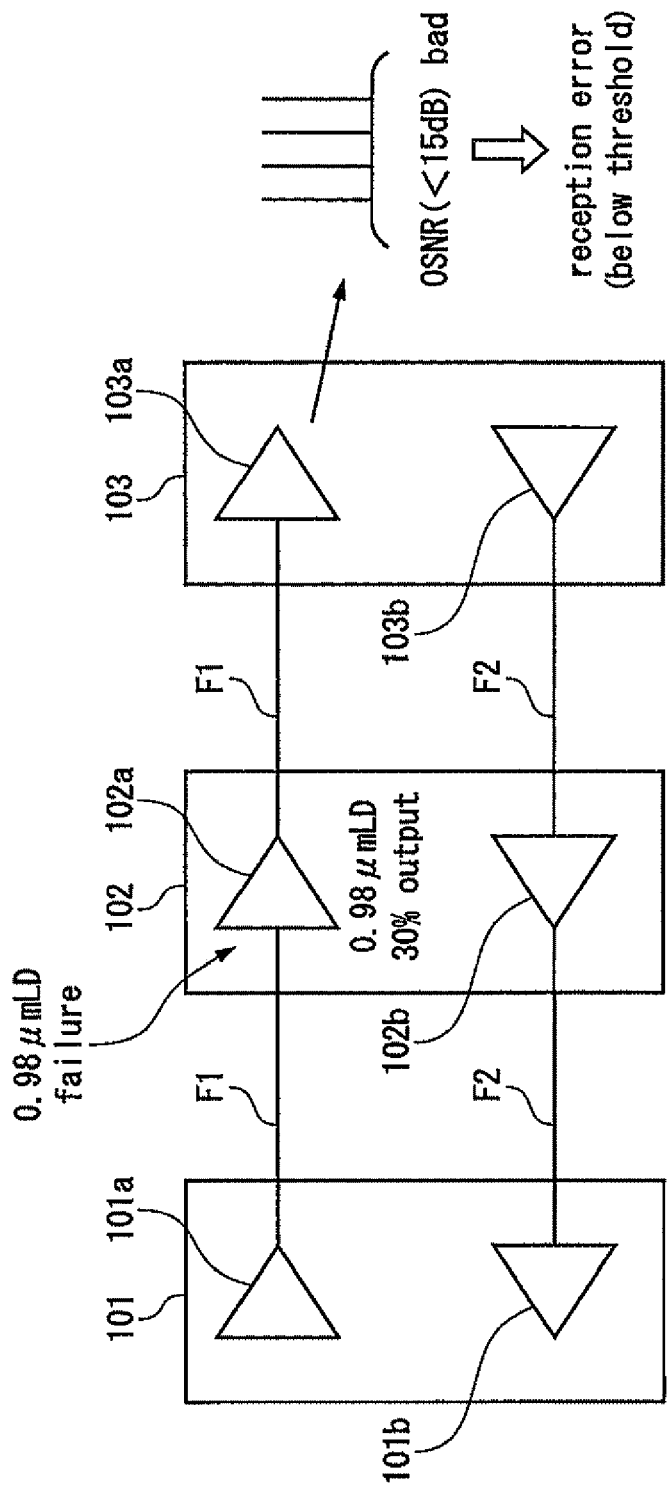
Figure 11:
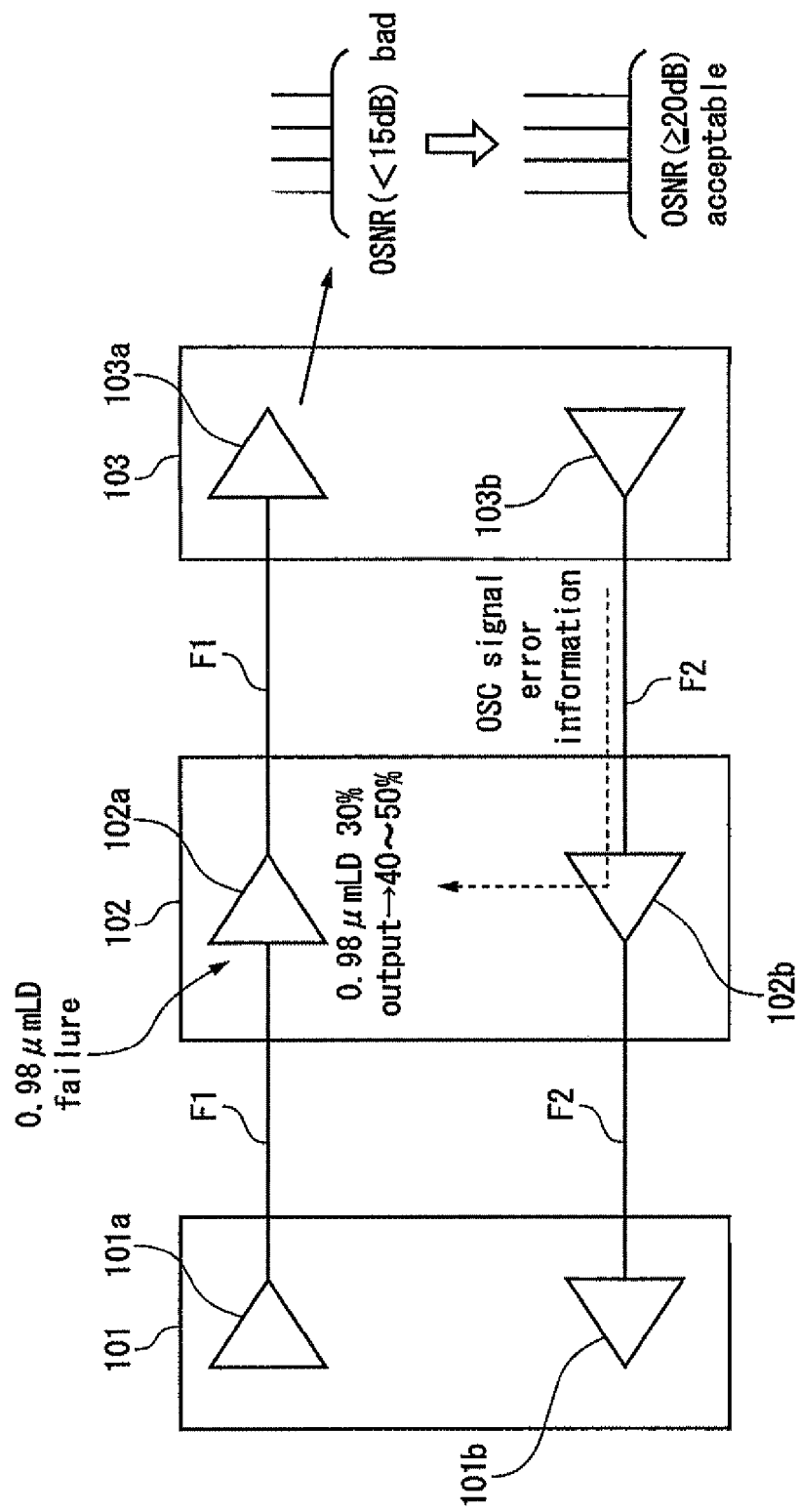

FIG. 9 to FIG. 11 are views showing a state in which the output control of the 0.98 μm LD 11b is performed using the OSC signal. A station 101 to a station 103 are connected to each other through a down direction optical fiber transmission path F1 and an up direction optical fiber transmission path F2. One station includes an optical transmission apparatus for up direction transmission and one for down direction transmission.

The station 101 includes a down optical transmission apparatus 101a and an up optical transmission apparatus 101b, the station 102 includes a down optical transmission apparatus 102a and an up optical transmission apparatus 102b, and the station 103 includes a down optical transmission apparatus 103a and an up optical transmission apparatus 103b. The up optical transmission apparatus and the down optical transmission apparatus correspond to the optical amplifying apparatus 10.

FIG. 9 shows a state at the time of normal operation. The 0.98 μm LD in the optical transmission apparatus 102a of the station 102 normally operates. The OSNR in the station 103 is 25 dB or more, and the state is excellent.

FIG. 10 shows a state where the failure occurs. The failure occurs in the 0.98 μm LD in the optical transmission apparatus 102a of the station 102, the output of the 0.98 μm LD becomes 30% of the initial output by the output reduction control, and the gain of the 1.48 μm LD is increased by the power insufficiency to perform the output constant control. On the other hand, in the station 103 positioned at the downstream side, when the output of the 0.98 μm LD is 30%, the OSNR becomes 15 dB or less, and becomes an allowable value or less of reception error strength.

FIG. 11 is a view showing a state in which error notification is made by the OSC signal. The station 103 superimposes error information on the OSC signal, outputs the OSC signal to flow through the upward line F2, and notifies the upstream station 102 of the error state. The optical transmission apparatus 102b in the station 102 extracts the error information from the OSC signal, recognizes the reception state in the station 103, and increases the output so that the output of the 0.98 μm LD becomes 40 to 50%.

As stated above, while the reception state of the downstream station is monitored by using the OSC signal, the reduction degree of the output power of the 0.98 μm LD where the failure occurs is adjusted, so that it becomes possible to prevent extreme transmission quality degradation from occurring in the reception state.

Incidentally, as stated above, although the OSNR is improved when the output of the 0.98 μm LD is increased, when the output is excessively increased, the sudden death degradation of the 0.98 μm LD is naturally accelerated, and the main signal interruption is accelerated. Thus, it is appropriate that the control is performed while about 50 to 65 mW (40 to 50% of the initial power) is made the upper limit.

Next, a determination method of failure of the 0.98 μm LD 11b will be described. Since the optical amplifying apparatus 10 changes the amplified output according to the wavelength multiplexing number, it is necessary to change a criterion of the determination of the failure according to the power.

Figure 12:
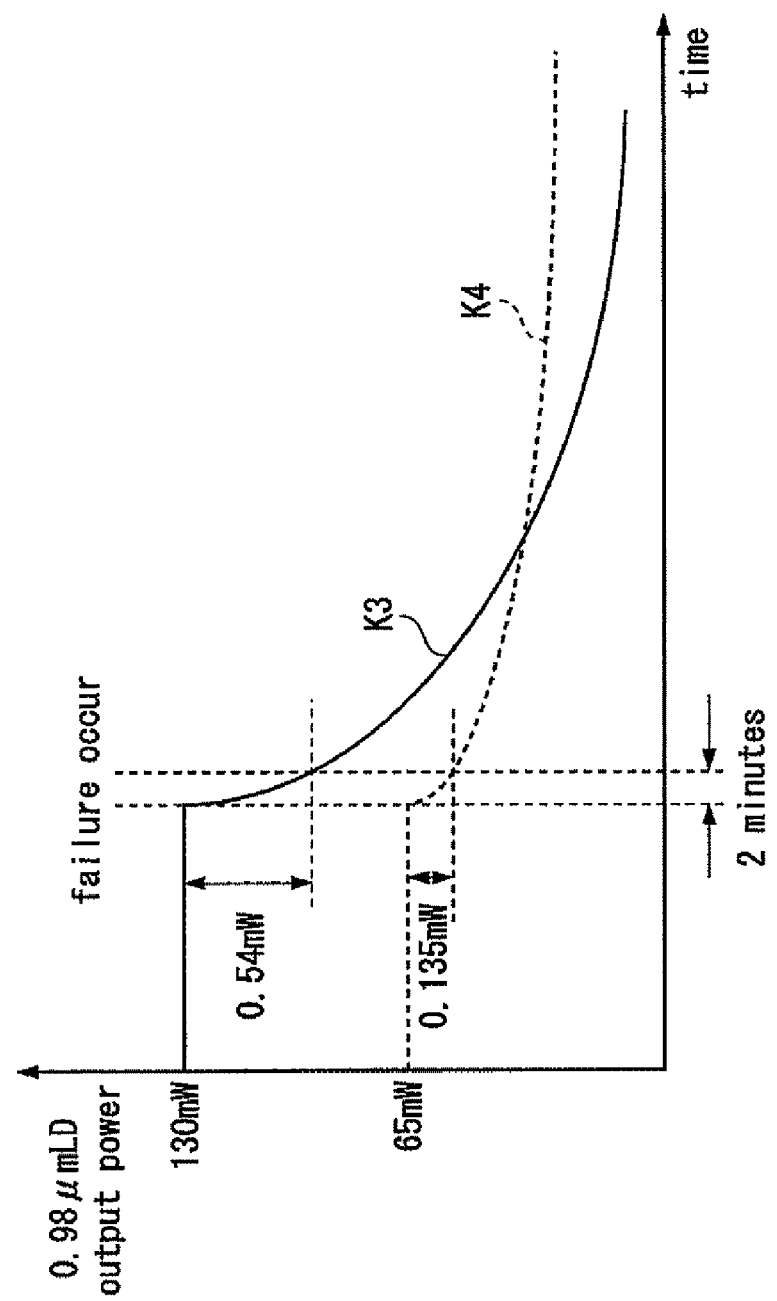
FIG. 12 is a view showing one determination method of the failure.
Figure 13:
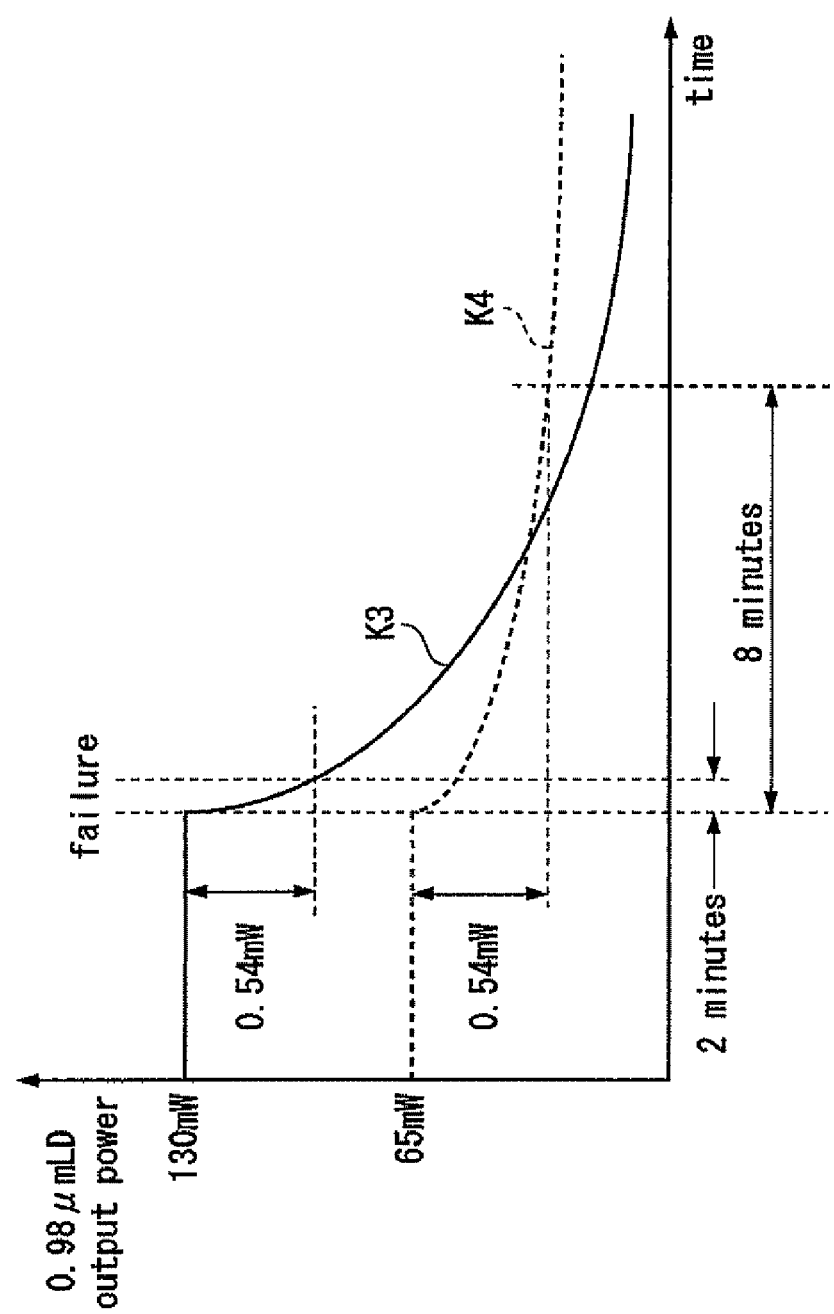
FIG. 13 is a view showing the other determination method of the failure.

FIG. 12 and FIG. 13 are views showing the determination method of the failure. The horizontal axis indicates time, and the vertical axis indicates 0.98 μm LD output power. A solid line K3 indicates a state in which in the case where the wavelength multiplexing number is large, the failure occurs during the operation of the 0.98 μm LD 11b with the initial output power (130 mW) and the output level is reduced. A broken line K4 indicates a state in which in the case where the wavelength multiplexing number is small, the failure occurs during the operation of the 0.98 μm LD 11b with the initial output power (65 mW) and the output level is reduced.

As stated above, as the wavelength multiplexing number becomes large, the reduction degree of the output power also becomes large, and also with respect to the determination as to whether or not the failure occurs, it is necessary to change the threshold value according to the initial LD output power.

In the solid line K3, with a high output power of 130 mW from 0.98 μm LD 11b, the inclination of power at the time of failure is rapidly reduced. In this case, the reduction amount of 0.54 mW or more in 2 minutes is made the threshold value of the failure.

On the other hand, if the output power of the 0.98 μm LD 11b is a half, with 65 mW, two methods for the for threshold value is adopted.

FIG. 12 shows one of the two methods. In FIG. 12, the threshold value is made to a reduction amount of 0.135 mW in 2 minutes, which is ¼ times smaller in reduction amount than that of 130 mW output case.

FIG. 13 shows the other method. In FIG. 13, the threshold value is made to a reduction of 0.54 mW in 8 minutes, which is four times longer in time than that of 130 mW output case.

The above explained 4 times longer time or ¼ times smaller reduction amount are obtained from the relation that the acceleration of the failure degradation is in proportion to substantially the square of the power ratio as described above.

Accordingly, when the above content is generalized and written, at the time of the operation of the 0.98 μm LD with the initial output power P (−130 mW), when the power amount of excitation light is reduced by Δp (=0.53 mW) in a fixed time m (=2 minutes), it is regarded that the failure occurs.

In this case, when the 0.98 μm LD 11b is operated with the output power P/n (=135/2=65 mW) lower by a factor of 1/n (n is an integer) than the initial output power P, the threshold value is set to $\Delta p/n^2$, and in the case where the level variation rate is larger than $\Delta p/n^2$ in the fixed time m, it is judged that the failure occurs in the 0.98 μm LD 11b.

That is, in the above example, since n is 2, the threshold value $\Delta p/n^2$ is set to 0.135 (=0.53/$2^2$) mW, and in the case where the level variation rate is larger than 0.135 mW in the fixed time m (=2 minutes), it is judged that the failure occurs.

Besides, the threshold value is set to Δp, and in the case where the level variation rate is larger than Δp in a fixed time (m×$n^2$), it is judged that the failure occurs in the 0.98 μm LD 11b.

That is, in the above example, since n is 2, the threshold value Δp is set to 0.53 mW, and in the case where the level variation rate is larger than 0.53 mW in the fixed time 8 (=2×$2^2$), it is judged that the failure occurs in the 0.98 μm LD 11b.

Next, a description will be given to a control in which the output power of the 0.98 μm LD 10b is temporarily increased to judge that the failure occurs. In the case where the wavelength multiplexing number is small, and the operation continues in a state where the output power of the 0.98 μm LD 11b is low, even if the failure occurs in the 0.98 μm LD 11b, there is a case where the output power continues to be reduced without exceeding the threshold value.

In this case, the time change of the output power reduction is very small, and even if it can be recognized that the output power is reduced, it is difficult to judge whether the power reduction is due to the failure or the power reduction is due to aging or the like.

Accordingly, when the 0.98 μm LD 11b is operated with the low power, in the case of detecting such gentle and small power reduction that the level variation rate does not exceed the threshold value, the output of the 0.98 μm LD 11b is once increased to, for example, 100 mW or more, the operation is performed for 10 to 30 minutes, a change in power at that time is observed, and it is judged whether or not the failure occurs. That is, the output power of the 0.98 μm LD 11b is temporarily increased, the failure degradation is accelerated intentionally, the magnitude of the level variation rate at that time is observed, and it is checked whether or not the failure occurs.

Incidentally, even in the case where the output power of the 0.98 μm LD 11b is once increased, the back stage 1.48 μm LD 12b is controlled, and the control is performed so that the output of the optical amplifying apparatus 10 is kept constant, and accordingly, there is no bad influence on the transmission quality or the like.

Besides, in order to prevent the failure degradation from being rapidly accelerated, the time in which the output of the 0.98 μm LD 11b is increased is made about 10 to 20 minutes or shorter. In the case where it is judged by the observation during the time that the failure does not occur, the output is reduced to the original and the operation is continued, and in the case where it is judged that the failure occurs, after the output is reduced to the original, an alarm is issued, and it is notified that the replacement is needed.

Figure 14:
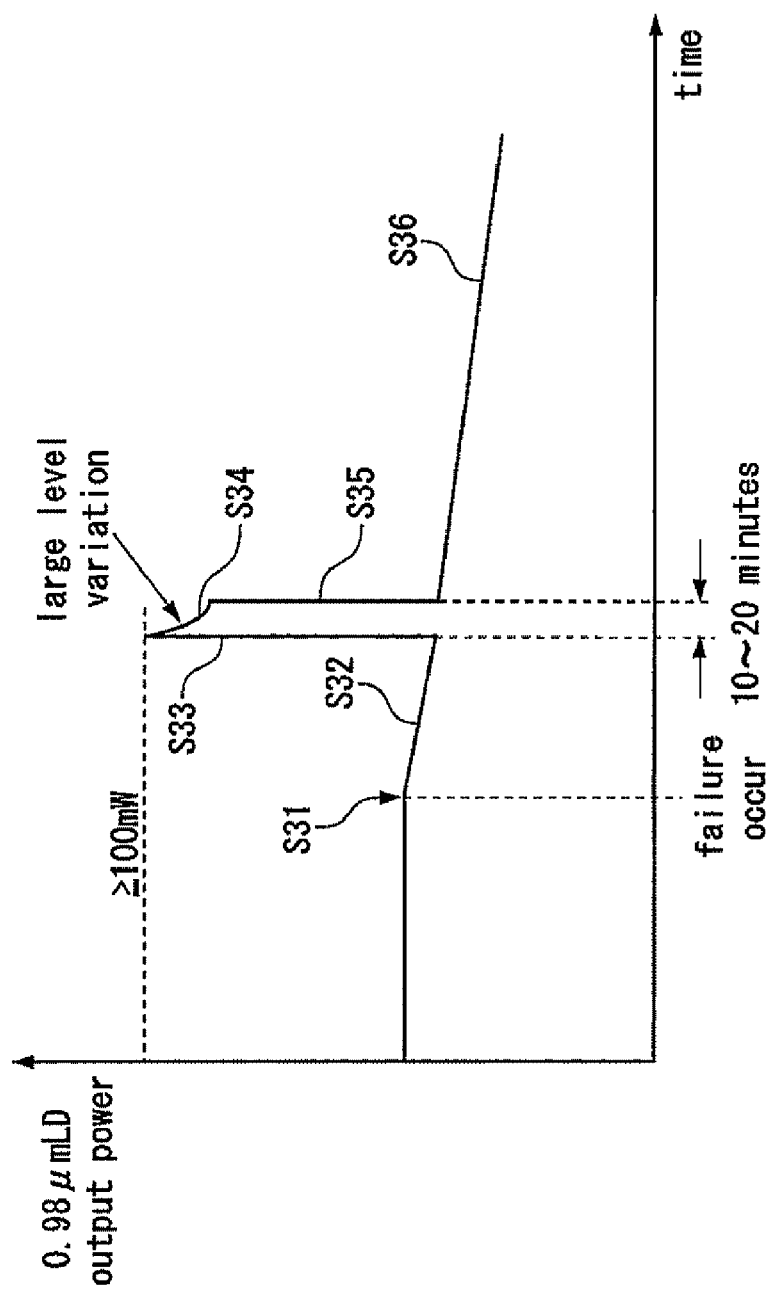
FIG. 14 is a view in which the output power of the 0.98 μm LD is temporarily increased and the failure is judged.
Figure 15:
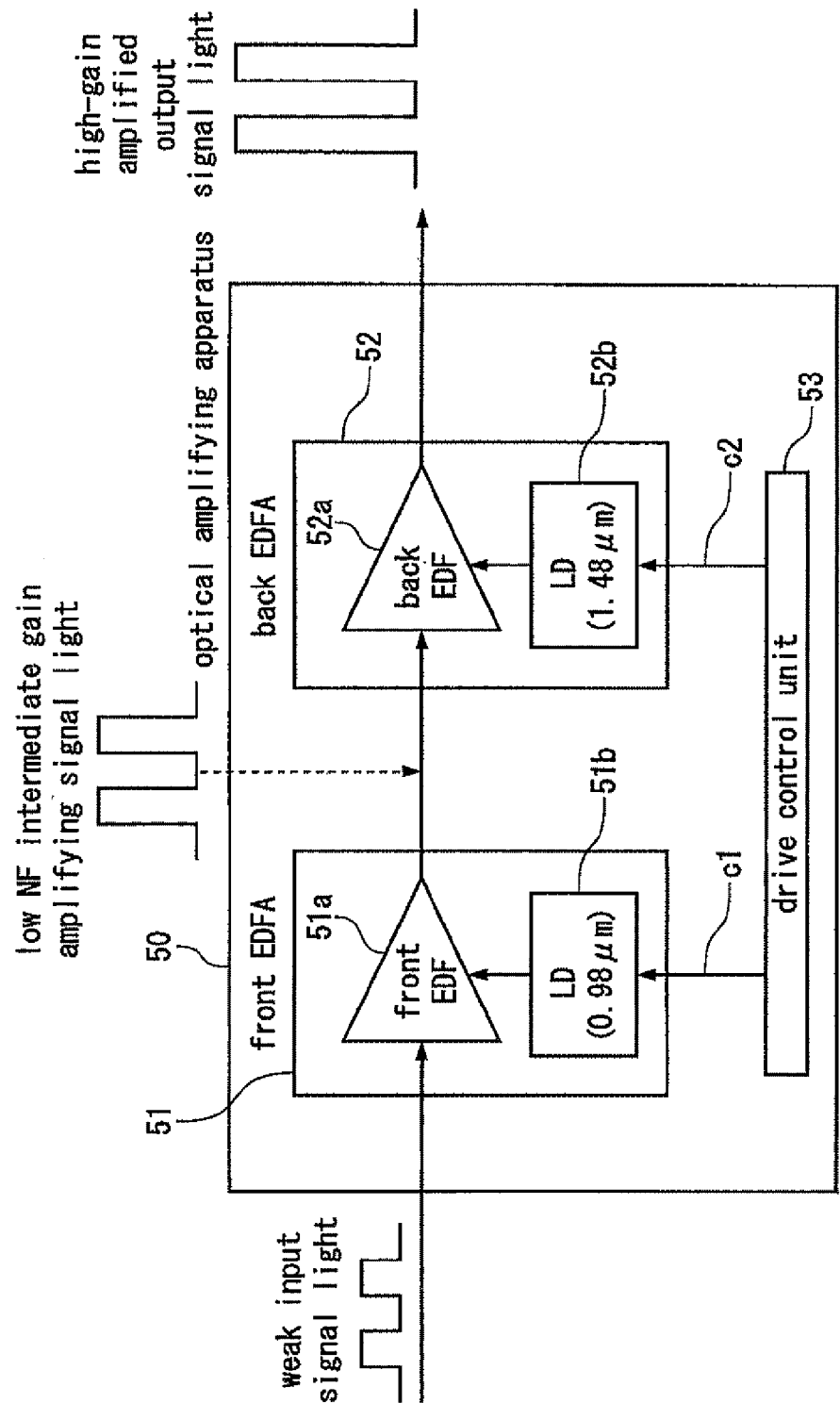
FIG. 15 is a view of an optical amplifying apparatus.

FIG. 14 is a view in which the output power of the 0.98 μm LD is temporarily increased and the failure is judged. The horizontal axis indicates time, and the vertical axis indicates 0.98 μm LD output power.

(s31) Sudden death due to the failure occurs in the 0.98 μm LD 11b.

(S32) The gentle output reduction is seen from the monitor result.

(S33) The control unit 13 increases the drive current to temporarily increase the output power of the 0.98 μm LD 11b in order to judge whether the output reduction at step S32 is due to the failure or is due to aging or the like.

(S34) When the failure occurs, a remarkable level variation rate appears. The control unit 13 judges that the level variation rate is large, and recognizes that the failure occurs in the 0.98 μm LD 11b.

(S35) The control unit 13 decreases the drive current supplied to the 0.98 μm LD 11b to reduce the output power, and issues an alarm.

(S36) After the alarm is issued, part replacement is performed before main signal interruption.

Incidentally, when the reduction of the level variation rate not exceeding the threshold value is detected, the 0.98 μm LD drive current is increased for a fixed time to monitor the level variation rate, and in the case where it is recognized that the failure does not occur (in the case where the output level reduction of the 0.98 μm LD 11b irrelevant to the occurrence of the failure is detected), since it is regarded as the output reduction due to normal aging, the drive current is increased, and the output constant control of the 0.98 μm LD 11b is performed.

As described above, according to the invention, even in the case where the sudden death due to the failure of the 0.98 μm LD 11b occurs, the service is continued without extremely degrading the transmission quality, and the time to the main signal interruption can be extended, and it becomes possible to gain the time to the maintenance and replacement.

Although a few preferred embodiments of the present invention have been shown and described, it would be appreciated by those skilled in the art that changes may be made in these embodiments without departing from the principles and spirit of the invention, the scope of which is defined in the claim and their equivalents.

What is claimed is:

1. An optical amplifying apparatus comprising:
   a rare-earth doped amplifying medium;
   a light source outputting excitation light to the amplifying medium in accordance with a drive current of the light source; and
   a control unit
      monitoring a level variation rate of the excitation light, and
      when the monitored level variation rate is larger than a threshold value which indicates degradation of the light source is occurring, decreasing the drive current to reduce an output level of the excitation light.

2. The optical amplifying apparatus according to claim 1, wherein the light source is a laser diode that outputs 0.98 μm light.

3. The optical amplifying apparatus according to claim 1, wherein light absorption of a material in the light source increases in a wavelength of excitation light when the light source is degraded.

4. The optical amplifying apparatus according to claim 1, wherein the threshold value is power reduction of $\Delta p$ in a fixed time m when output power before the reduction is P, or the threshold value for an output power of P/n is $\Delta p/n^2$ in the fixed time m or $\Delta p$ in a fixed time $(m \times n^2)$, where n is an integer.

5. The optical amplifying apparatus according to claim 1, wherein in a case where the output level of the excitation light continues reducing but the monitored level variation rate does not exceed the threshold value, the control unit controls the drive current to increase for a fixed time.

6. The optical amplifying apparatus according to claim 1, wherein in a case where the output level of the excitation light continues reducing but the monitored level variation rate does not exceed the threshold value, the control unit controls the drive current to make the output level of the excitation light constant.

7. The optical amplifying apparatus according to claim 5, wherein in the case where the monitored level variation rate exceeds the threshold value, the control unit controls the drive current based on a reception quality of a downstream reception station.

8. The optical amplifying apparatus according to claim 7, wherein the reception quality of the downstream reception station is obtained from the supervisory control signal transmitted by the downstream station.

9. The optical amplifying apparatus according to claim 2, wherein in a case where the output level of the excitation light continues reducing but the monitored level variation rate does not exceed the threshold value, the control unit controls the drive current to make the output level of the excitation light constant.

10. An apparatus comprising:
a rare-earth doped amplifying medium through which signal light travels;
a light source outputting excitation light in accordance with a drive current of the light source, the outputted excitation light being providing to the amplifying medium so that the signal light is amplified as the signal light travels through the amplification medium; and
a controller decreasing the drive current when a monitored output level variation rate of the outputted excitation light is larger than a threshold value to thereby reduce power level of the outputted excitation light and thereby delay progress of degradation of the light source that is occurring and is indicated by the monitored output level variation rate being larger than the threshold value.

11. An apparatus comprising:
a controller monitoring output level variation rate of excitation light outputted by a light source in accordance with a drive current of the light source and provided to a rare-earth doped amplifying medium so that a signal light is amplified as the signal light travels through the amplifying medium, and decreasing the drive current when the monitored output level variation rate is larger than a threshold value, to thereby reduce power level of the outputted excitation light and thereby delay progress of degradation of the light source that is occurring and is indicated by the monitored output level variation rate being larger than the threshold value.

12. A method comprising:
monitoring output level variation rate of excitation light outputted by a light source in accordance with a drive current of the light source and provided to a rare-earth doped amplifying medium so that a signal light is amplified as the signal light travels through the amplifying medium; and
decreasing the drive current when the monitored output level variation rate is larger than a threshold value, to thereby reduce power level of the outputted excitation light and thereby delay progress of degradation of the light source that is occurring and is indicated by the monitored output level variation rate being larger than the threshold value.

13. An apparatus comprising:
means for monitoring output level variation rate of excitation light outputted by a light source in accordance with a drive current of the light source and provided to a rare-earth doped amplifying medium so that a signal light is amplified as the signal light travels through the amplifying medium; and
means for decreasing the drive current when the monitored output level variation rate is larger than a threshold value, to thereby reduce power level of the outputted excitation light and thereby delay progress of degradation of the light source that is occurring and is indicated by the monitored output level variation rate being larger than the threshold value.

14. The optical amplifying apparatus according to claim 1, wherein the degradation that is occurring is a result of sudden death of the light source.

15. The optical amplifying apparatus according to claim 2, wherein the degradation that is occurring is a result of sudden death of the light source.

16. The apparatus according to claim 10, wherein the degradation that is occurring is a result of sudden death of the light source.

17. The apparatus according to claim 11, wherein the degradation that is occurring is a result of sudden death of the light source.

18. The method according to claim 12, wherein the degradation that is occurring is a result of sudden death of the light source.

19. The apparatus according to claim 13, wherein the degradation that is occurring is a result of sudden death of the light source.

* * * * *